United States Patent Office 2,958,712
Patented Nov. 1, 1960

2,958,712
STABILIZATION OF CHLORINATED HYDROCARBONS

Fred W. Starks, Kenmore, N.Y., assignor to E. I. du Pont de Nemours and Company, Wilmington, Del., a corporation of Delaware No Drawing. Filed Mar. 6, 1958, Ser. No. 719,516

11 Claims. (Cl. 260—652.5)

This invention relates to chlorinated hydrocarbons stabilized by the addition thereto of small amounts of certain chemicals. It relates particularly to trichlorethylene and perchlorethylene.

The removal of grease films from metallic surfaces has been practiced for many years. Generally, the removal is accomplished by suspending the metal to be degreased in a boiling fat-solvent at atmospheric pressure. Suitable fat-solvents including particularly the chlorinated hydrocarbons, of which trichlorethylene, perchlorethylene, tetrachlorethane and ethylene chloride are representative, but others may be utilized as well.

Trichlorethylene is probably the solvent most widely used in such operations. It is, however, seldom used in the pure state. Instead, stabilizing agents are usually added to prevent decomposition under the conditions of storage and utility. Light and oxygen, for example, decompose trichlorethylene very rapidly. Heat is also deleterious to this solvent and may accelerate the effects of light and oxygen. Unless precautions are taken, decomposition from heat, light and oxygen takes place under ordinary conditions. This type of decomposition may, therefore, be called "normal." Many compounds are known which, in trace amounts, will inhibit normal decomposition.

Another type of decomposition occurs when the workpiece to be degreased is made of aluminum or an aluminum alloy. The stabilizers effective to prevent decomposition by oxygen, light or heat are, in general, powerless against decomposition caused by aluminum. Resultant solvent degradation is made manifest by a rapid increase in acidity, discoloration of the solvent media and formation of black oils and tars. The same type of decomposition is also noted but in smaller degree in iron degreasing.

The causes of this metal induced decomposition are not exactly known. However, it is evident that whatever the mechanism, its initiation probably involves the production of hydrogen chloride. Hydrogen chloride may result from air oxidation of the chlorinated hydrocarbon, the decomposition of the chlorinated cutting oils frequently removed from metallic workpieces by degreasing or the catalytic effect of metal surfaces on these chlorinated compounds. This hydrogen chloride then reacts with the metal surface forming halide salts. When metallic aluminum or an aluminum alloy is being degreased, aluminum chloride is formed and this salt is an extremely active catalyst for the decomposition of chlorinated solvents, such as trichlorethylene and perchlorethylene. Solvent degradation is evidenced by a rapid rise in temperature and pronounced discoloration. In advanced stages, there is formed a black, tarry mass which may deposit on the workpiece. The same phenomenon may also be observed in iron degreasing where ferric chloride is a decomposition catalyst, but to a much lesser extent. In any event, it has heretofore been necessary to shut down operations and to remove non-volatiles and metal fines at frequent intervals. Such shut-downs entail additional labor, loss of production and loss of solvent. Hence, this metal induced decomposition detracts from the economics of the degreasing process.

A major object of this invention, is therefore, provision of a novel and useful method of stabilizing chlorinated hydrocarbons, particularly trichlorethylene and perchlorethylene.

Another object is provision of a method for stabilizing chlorinated hydrocarbons against decomposition induced by metals, aluminum in particular.

An additional object is provision of a chlorinated hydrocarbon stabilized against decomposition induced by aluminum.

The above-mentioned and still further objects may be accomplished in the spirit of this invention by dissolving a small amount of a lactone in trichlorethylene or perchlorethylene.

The lactones of this invention are the usual lactones or polylactones of aliphatic or araliphatic hydroxy carboxylic acids. Structurally they may contain one or more lactone rings and may also include an aromatic benzene ring. They may be completely saturated or they may contain ethylenic carbon-carbon linkages. In general, the preferred lactones are the mono-or di-lactones based on aliphatic hydroxy-carboxylic acids in which the lactone ring contains 3 to 6 carbon atoms. Compounds of the preferred type include beta-propiolactone, gamma-butyrolactone, gamma - valerolactone, alpha - angelicalactone, beta-angelicalactone, delta-valerolactone,

[Δ2,2'(5H,5'H)-bifuran]-5,5'-dione and tetra hydro-[2,2'-bifuran]-5,5'(2H,2'H)-dione. The latter bifuran dilactones are described in the patent application of John C. Sauer, S.N. 549,155, filed November 25, 1955. Although not of the preferred type, araliphatic lactones such as phthalide and coumarin are broadly included as lactones of this invention.

The quantity of lactone required for effective stabilization of the chlorinated hydrocarbon is not very great, but will vary to some extent with the individual compound. In general between about 0.1% and 5% by weight of the additive is effective. However, some stabilization takes place even when much lower concentrations are employed.

There follow some examples which illustrate details of the invention. In these examples, the presence of aluminum chloride simulates stringent operating conditions in a metal degreaser. All pressures are those of the ambient atmosphere and all concentrations are in percent by weight.

*Example 1*

This example shows the decomposition of trichlorethylene in the absence of the stabilizers of this invention on exposure to aluminum chloride. The trichlorethylene employed in this and subsequent examples contained small concentrations of phenol, p-tertiary amyl phenol, di-isobutylene and N-methyl pyrrole. These additives are commonly employed to prevent normal decomposition. A 100 ml. sample of this stabilized trichlorethylene and 0.5 g. of anhydrous aluminum chloride were placed in a flask equipped with a reflux condenser and heated to boiling. Decomposition was extremely rapid and the sample was black, opaque and contained a large amount of black precipitate by the time it reached reflux temperature. It was then flooded with water to arrest the exothermic decomposition reaction.

*Example 2*

A 100 ml. sample of the trichlorethylene stock employed in Example 1 was additionally stabilized by the addition of 0.5% of gamma-butyrolactone giving a colorless solution. This solution and 0.5 g. anhydrous aluminum chloride were then placed in flask equipped with a reflux condenser and boiled for seventy hours and thirty minutes. When the refluxing commenced, the liquid was cloudy and showed a small quantity of black sediment. On further refluxing the liquid darkened. When the refluxing had been completed, the liquid was dark and cloudy but contained only a small amount of sediment.

*Example 3*

A 100 ml. of the trichlorethylene stock employed in the previous examples in which 0.5% of gamma-valerolactone had been dissolved was placed in a flask with 0.5 g. aluminum chloride. The flask was equipped with a reflux condenser and the contents were refluxed for 71.0 hours. The boiling material was originally light and clear but became dark on further heating. When the reflux period was complete, the solution was black and contained a small amount of sediment.

*Example 4*

A solution of 0.5% of alpha-angelicalactone in 100 ml. of the trichlorethylene stock was treated with 0.5 g. of anhydrous aluminum chloride and boiled for 71.2 hours in a flask equipped with a reflux condenser. The solution soon developed a small amount of black sediment but remained light and clear in appearance. When the reflux period had been completed, the liquid was still clear and light yellow in color but contained a black sediment.

It should be noted that numerous variations are possible without departing from the spirit of this invention. Perchlorethylene may be employed in place of trichlorethylene as previously pointed out. This solvent is more stable with respect to aluminum chloride catalyzed decomposition and, consequently, requires less lactone for protection. A wide variety of lactones can be used as stabilizers provided they are soluble in the chlorinated solvent.

Having described my invention, I claim:

1. The method of stabilizing a chlorinated hydrocarbon selected from the group consisting of trichlorethylene and perchlorethylene which comprises supplying thereto a lactone selected from the group consisting of mono- and di-lactones in which all of the lactone rings contain 3–6 carbon atoms, said lactone being soluble in said chlorinated hydrocarbon in an amount effective to stabilize the same against decomposition induced by metals and metallic salts.

2. The method of stabilizing trichlorethylene which comprises dissolving therein about 0.1 to 5% of a lactone selected from the group consisting of aliphatic saturated and ethylenically unsaturated mono- and di-lactones in all of which the lactone rings contain 3 to 6 carbon atoms.

3. The method of stabilizing perchlorethylene which comprises dissolving therein about 0.1 to 5% of a lactone selected from the group consisting of aliphatic saturated and ethylenically unsaturated mono- and di-lactones in all of which the lactone rings contain 3 to 6 carbon atoms.

4. The method of stabilizing trichlorethylene which comprises dissolving therein 0.1 to 5% of gamma-butyrolactone.

5. The method of stabilizing trichlorethylene which comprises dissolving therein 0.1 to 5% gamma-valerolactone.

6. The method of stabilizing trichlorethylene which comprises dissolving therein 0.1 to 5% of alpha-angelicalactone.

7. A chlorinated hydrocarbon of the group consisting of trichlorethylene and perchlorethylene containing dissolved therein about 0.1 to 5% of a lactone selected from the group consisting of mono- and di-lactones in which all of the lactone rings contain 3–6 carbon atoms as a stabilizer against decomposition induced by metals and metal salts.

8. The composition of claim 7 in which the lactone is selected from the group consisting of aliphatic saturated and ethylenically unsaturated mono- and di-lactones in all of which the lactone rings contain 3 to 6 carbon atoms.

9. Trichlorethylene containing 0.1 to 5% of gamma-butyrolactone and thereby stabilized against metal-induced decomposition.

10. Trichlorethylene containing 0.1 to 5% of gamma-valerolactone and thereby stablized against metal-induced decomposition.

11. Trichlorethylene containing 0.1 to 5% of alpha-angelicalactone and thereby stabilized against metal-induced decomposition.

References Cited in the file of this patent

UNITED STATES PATENTS

| | | |
|---|---|---|
| 2,298,638 | Prutton | Oct. 13, 1942 |
| 2,371,647 | Petering et al. | Mar. 20, 1945 |
| 2,595,636 | Brighton et al. | May 6, 1952 |
| 2,752,325 | Leistner | June 26, 1956 |